(12) United States Patent
Picott

(10) Patent No.: US 7,414,626 B1
(45) Date of Patent: Aug. 19, 2008

(54) SYSTEM FOR PASSING ALGORITHMS WITH POLYMORPHIC PARAMETER SETS IN A DEPENDENCY GRAPH OF A GRAPHIC CREATION PROCESS

(75) Inventor: Kevin Peter Picott, Burlington (CA)

(73) Assignee: Autodesk, Inc., San Rafael, CA (US)

( * ) Notice: Subject to any disclaimer, the term of this patent is extended or adjusted under 35 U.S.C. 154(b) by 54 days.

(21) Appl. No.: 09/580,563

(22) Filed: May 30, 2000

(51) Int. Cl.
*G06T 11/20* (2006.01)

(52) U.S. Cl. ........................ 345/440; 717/157

(58) Field of Classification Search ................. 345/440; 717/155–157, 132–133, 144; 716/4
See application file for complete search history.

(56) References Cited

U.S. PATENT DOCUMENTS

| | | | | |
|---|---|---|---|---|
| 4,922,413 A | * | 5/1990 | Stoughton et al. | 712/26 |
| 4,972,314 A | * | 11/1990 | Getzinger et al. | 711/149 |
| 5,325,518 A | * | 6/1994 | Bianchini, Jr. | 714/31 |
| 5,408,638 A | * | 4/1995 | Sagawa et al. | 716/20 |
| 5,666,296 A | * | 9/1997 | Gafter | 716/3 |
| 5,673,200 A | * | 9/1997 | Toyonaga et al. | 716/18 |
| 5,684,807 A | * | 11/1997 | Bianchini et al. | 714/712 |
| 5,808,625 A | | 9/1998 | Picott et al. | |
| 5,929,864 A | | 7/1999 | Picott et al. | |
| 6,044,211 A | * | 3/2000 | Jain | 716/18 |
| 6,064,819 A | * | 5/2000 | Franssen et al. | 717/156 |
| 6,216,138 B1 | * | 4/2001 | Wells et al. | 707/502 |
| 6,550,059 B1 | * | 4/2003 | Choe et al. | 717/159 |

* cited by examiner

*Primary Examiner*—Motilewa Good-Johnson
(74) *Attorney, Agent, or Firm*—Staas & Halsey LLP

(57) ABSTRACT

A system that passes algorithms or functions between dependency nodes of a dependency graph in a graphic creation process system using a pointer or by passing a self-evaluating data structure. An evaluation process associated with the graph includes an ability to distinguish between passed parameters based on type where one of the types allowed is a function type and types are identified dynamically as the dependency graph is executed. The node receiving the algorithm executes the received algorithm along with it's own algorithm avoiding the necessity of traversing the graph multiple times when a data series is executed. The system also provides a mapping that allows parameters of the function to be reordered to match the source and destination function requirements. Default values allow evaluation even when less than all parameters associated with the function are passed. Mapping flags allow passed parameters to be ignored.

25 Claims, 5 Drawing Sheets

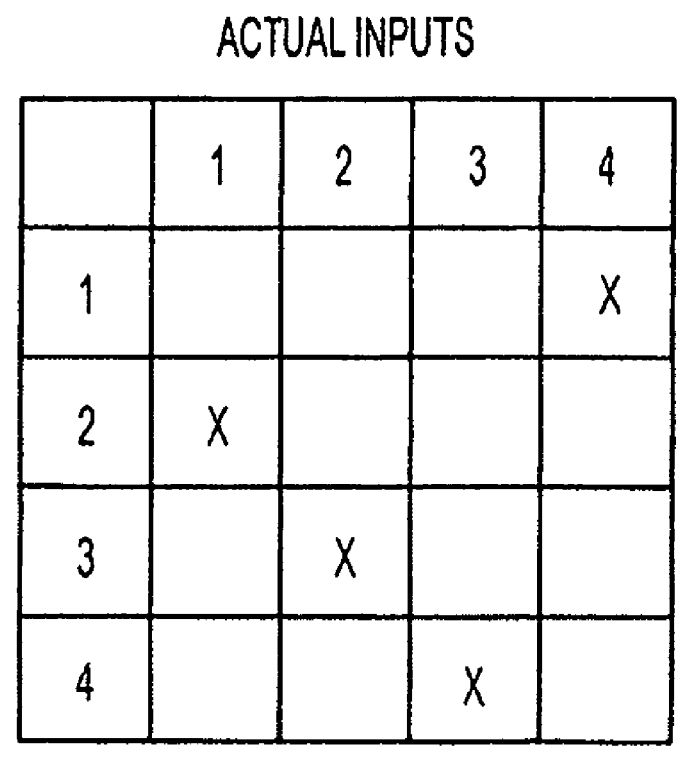

ACTUAL INPUTS

|   | 1 | 2 | 3 | 4 |
|---|---|---|---|---|
| 1 |   |   |   | X |
| 2 | X |   |   |   |
| 3 |   | X |   |   |
| 4 |   |   | X |   |

FIG. 6

SYSTEM FOR PASSING ALGORITHMS WITH POLYMORPHIC PARAMETER SETS IN A DEPENDENCY GRAPH OF A GRAPHIC CREATION PROCESS

BACKGROUND OF THE INVENTION

1. Field of the Invention

The present invention is directed to a system for evaluating dependancy graphs in a graphics creation environment more efficiently and, more particularly, to a system that passes not only data but also passes functions or algorithms between dependancy nodes.

2. Description of the Related Art

As graphics creation processes, such as the Maya™ system available from Alias|Wavefront, Inc. a subsidiary of Silicon Graphics, Inc., typically used for animation and visual effects have gotten more complicated, designers have looked for ways in which to better control access to needed data and to better control the execution of the processes involved to improve execution speed or efficiency and resource utilization. One of the ways in which this has been accomplished is to control execution through a mechanism, such as available in Maya™, called a dependency graph. A dependency graph (DG) and an associated node evaluation process as described by U.S. Pat. Nos. 5,808,625 and 5,929,864 (incorporated by reference herein) provides a method for passing data through dependency nodes in a dependency graph. One of the drawbacks of this method is that the graph is a static object and can only be evaluated in a single state. The graph's state can be changed between evaluations through altering the input values but at any evaluation step there is only one value available at each input attribute.

Additionally, algorithms are hard coded into the dependency nodes, making it impossible to share the remainder of the code. Function calls also have fixed argument lists which are not sufficient for those writing replacement algorithms. Data streams requiring large amounts of evaluation are inefficient when going between dependency node connections.

Because of these issues, one situation not well handled by this arrangement is the desire to evaluate a particular subgraph at many different combinations of inputs as rapidly as possible. Two problems arise; the possibility that the alteration of inputs will affect areas of the graph we do not wish to reevaluate, and the fact that traversing the graph to perform evaluations can be inherently more costly (time consuming) than simply evaluating the algorithms themselves.

The usual solution to these problems is to create many different nodes, one for each variation required.

The remedy for these problems, that is, what is needed is to allow not only data but also algorithms to be passed through the DG. Then, when a particular attribute is evaluated, the result is not the single value of that attribute with the current state of inputs, but instead an algorithm that can be used to evaluate the attribute at any desired combinations of inputs (graph states).

SUMMARY OF THE INVENTION

It is an object of the present invention to allow algorithms or functions to be passed between nodes in a graphics creation process dependency graph.

It is an additional object of the present invention to provide an evaluation process for a dependency graph that evaluates function input attributes.

It is another object of the present invention to allow the mapping of parameters, both input and output, into and out of the functions that are passed.

It is also an object of the present invention to allow the mapping of related but distinct data types.

It is a further object of the present invention to allow incompatible functions to drive each other.

It is an object the present invention to make a function of a source node an attribute of that node so that it can be passed to one or more destination nodes.

It is an object of the present invention to allow sparse definition of parameters in function calls through use of default values within the parameter mappings.

The above objects can be attained by a system that passes algorithms between nodes of a dependency graph in a graphic creation process system. The destination node receiving the algorithm executes the received algorithm along with it's own algorithm avoiding the necessity of traversing the graph multiple times when a data series is executed. The system also provides a mapping that allows parameters of the function to be sparsely reordered to match the source and destination function requirements. The algorithm can be passed using a pointer or by passing a self-evaluating data structure.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 depicts parameter mapping.

DESCRIPTION OF THE PREFERRED EMBODIMENTS

The present invention is directed to a system for flowing algorithms through a dependency graph (DG) where data passing is replaced by passing the algorithm that generated the data.

In a typical dependency graph evaluation, a function of a source node 2 (see FIG. 1), such as f(a)=b is called or evaluated as part of the evaluation of the node where a is the input data to the node 2 and b is the output data from the node 2. The output data is passed to a destination node, such as node 4, where the function for that node 4 (g(b)=c) is called or executed. Each time the input data changes, this two node evaluation process must be performed again. In the present invention, in contrast, the function itself is passed along with the data from source node 6 (see FIG. 2) to destination node 8 so that essentially g(f(d))=h is executed. As a result, if the input data "d" changes, or is a data series, the function can be evaluated without being burdened with the overhead of traversing the two nodes multiple times. Instead of traversing the node 6 to get data value e node 8 just calls the function f(d)=e, that has been passed followed by calling the function g(e)=h.

The implementation of the present invention uses the DG evaluation algorithms discussed in the patents mentioned previously and found in the Maya™ system also previously mentioned with the addition of a single data type which is a self-evaluating structure used to evaluate sections of a graph at any combination of inputs. The self-evaluating structure will be described below using pseudocode in an evolutionary manner; starting with a very basic embodiment of the structure that handles the simplest requirements and finishing with the an embodiment that handles desired functions of the invention.

Figure 3:
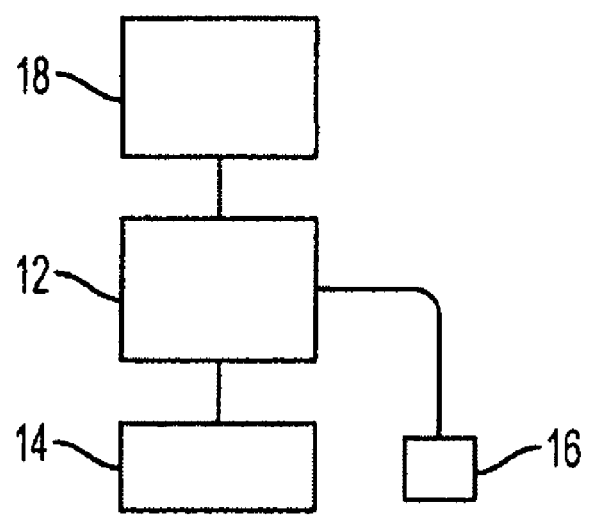
FIG. 3 depicts hardware of the present invention.

The present invention is typically included in a system, such as depicted in FIG. 3, where a computer 12, such as a Pentium III running Windows NT, is executing a graphics creation system, such as Maya™, as controlled by a user operating input devices such as a keyboard 14 and a mouse 16 or stylus, etc. The created graphic is displayed on a display 18 and the user is allowed to make modifications to the graphic. These modifications, as well as the original creation, are implemented through an evaluation controlled by the dependency graph where the present invention improves the speed of the evaluation by passing algorithms of the graph nodes.

Figure 4:
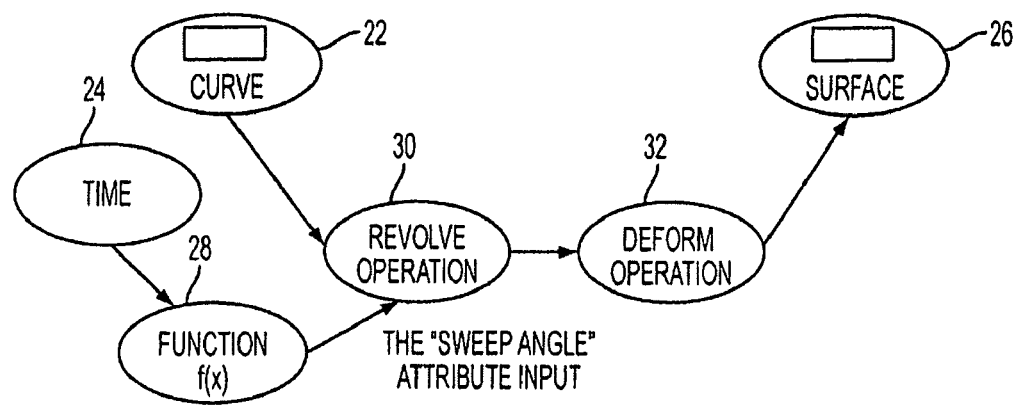
FIG. 4 illustrates a dependency node graph.

A dependency graph, such as illustrated in FIG. 4, can typically include "input" nodes such as node 22 which includes an input such as a curve and node 24 which includes a time parameter input. Also typically included are output nodes, such as node 26 which includes the surface created by processing with the DG. Intermediate nodes, such as function node 28 and operation nodes 30 and 32 control operation on the inputs to produce the output. Nodes such as the revolve operation node 30 include an algorithm that performs the desired operation, such as an algorithm that revolves an input around an axis, and which, in accordance with the present invention, can be passed to a downstream node, such as node 32, for actual evaluation.

Passing Simple Functions

The simplest type of algorithm that can evaluate itself is a strongly typed function. A strongly typed function is one with a defined set and type of inputs, and a defined set and type of outputs. Since the types are all well defined this kind of structure can be implemented using a simple function pointer.

The code class CfunctionDD set forth below illustrates a strongly typed data structure that can be used to contain a function f(x)=y, where x is a double value and y is a double value.

Strongly Typed Self-Evaluating Data Structure

```
class CfunctionDD:public Cfunction {
    CfunctionDD((double)(*)(double) f): fFunction(f) { }
    void evaluate( ) {fOutput=(*fFunction)(fInput);}
    void setInput(double I) {fInput=I;}
    double getOutput( ) {return fOutput;}
    double fInput;
    double fOutput;
    (double)(*)(double) fFunction;
}
```

The evaluation process is the same as in the DG evaluation process of the patents previously uncovered plus the addition of function evaluation once the function data has been retrieved from the DG attribute.

Generalizing the Types

The invention extends the idea of evaluating functions through data structures in several ways. The first of these ways is to make the types required by the function data structures more flexible in order to generalize the allowable connections within the dependency graph. For example, change a function parameter from "double" to "number" so that a function f(a)=b where a and b must both be double types, as in the example above, can match a function g(x)=y, where x and y are integer types. The evaluate process for function data set forth below helps accomplish this.

Dependency Graph Evaluation Process for Function Data

```
Evaluate(OutAttr)
{
    if(outAttr is not readable)
        quit
}
    For each input required to compute outAttr
        If(input attribute is connected)
            Evaluate input attribute connection and save
        Else if(input attribute has no saved value)
            Save default attribute value
        If(input attribute is a function type)
            For each input parameter
                SetValue(inputParameter)
            Evaluate input attribute
            Save function evaluation result
    Compute the outAttr using saved values
    Return the value to the calling routine
}
```

To generalize the types, a method of run-time type identification (RTTI—a conventional method by which you tag data types and their inheritance relationships for the purposes of identifying an unknown piece of data) can also be included, so that function parameter types can be identified dynamically as the program executes. The data structure itself can then contain the information necessary to describe the set of input and output parameters the function accepts. The simple function from the previous example becomes the more complex data structure below.

Generalized Self-Evaluating Functional Data Structure

```
Class CfunctionType {
    TrttiIdArray          fInputTypes;
    TrttiIdArray          fOutputTypes;
    TvoidPtrArray    fInputDefaults;
    TvoidPtrArray    fOutputDefaults;
    Void                  evaluate( ) = 0;
    Void                  setInput( index, newValue )
                              { fInputValues[index] = newValue; }
    outputValue           getOutput( index )
                              { return fOutputValues[index]; }
    TvoidPtrArray    fInputValues;
    TvoidPtrArray    fOutputValues;
    Void*            fFunctionPointer;
};
```

The instantiated data values for the function F(X)=Y are illustrated below. RTTIdouble is an identifier indicating the parameter in the corresponding position is of type double.

F(X)=Y Implemented Via the Self-Evaluating Functional Data Structure fInputTypes=[RTTIdouble];

fOutputTypes=[RTTIdouble];

fInputDefaults=[0.0];

fOutputDefaults=[0.0];

fInputValues=[X];

fOutputValues=[Y];

fFunctionPointer=&F;

Void evaluate( )=
    {fOutputValues[0]=(*fFunctionPointer)(fInputValues[0]);}

Figure 5:
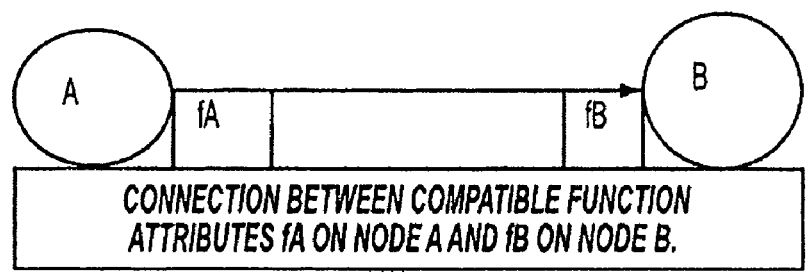
FIG. 5 shows a connection between compatible function attributes fA on node A and fB on node B.

This extra description information is to be used to determine if function attribute types within the DG are compatible. This involves verifying that input and output types of the functions at the source and destination attributes are the same. Then the function attribute fB (see FIG. 5) at the destination end node 42 of the connection can evaluate itself without any knowledge of the function fA at the other end or source node 44, which is a requirement for proper DG operation.

This added information introduces the possibility of incomplete input function settings (ie. by not specifically setting all values in the fInputValues array). To take advantage of this, default values for all input parameters are added to the data structure. By omitting calls to set certain input or output parameters their defaults will be used when the function is evaluated. In the context of the dependency graph (DG) this means that the source function need not be absolutely identical to the destination function, only that its inputs and outputs be a superset of those at the destination. A function that defines a surface, f(u,v)=(x,y,z) can for example be used as a source to a simple curve function g(a)=b, assuming all values are doubles.

The undefined second parameter v on functions will take on its default value while the first parameter u is set to g's parameter a. The output b of g will get it's value from the first output off, namely x, and the second and third outputs, y and z, off will be ignored. The data structure that defines the self-evaluating function passed through the connection looks as follows.

Data Structure For Source Function F(U,V)=(X,Y,Z)
fInputTypes=[RTTIdouble, RTTIdouble];
fOutputTYpes=[RTTIdouble, RTTIdouble, RTTIdouble];
fInputDefaults=[0.0, 0.0];
fOutputDefaults=[0.0, 0.0, 0.0];
fInputValues=[U, V];
fOutputValues=[X, Y, Z];
fFunctionPointer=&F;
void evaluate( )=
    {[fOutputValues[0], fOutputValues[1], fOutputValues[2]]=
        (*fFunctionPointer)([fInputValues[0], fInputValues[1]]);}

Note that due to the presence of default input values the fact that the node B will treat the function ƒ as though it only had one input and one output is unimportant. Only the compatibility of existing parameters is important.

Mapping Parameters

The limitation that parameters of the source function be a superset of the parameters of the destination function can also be removed.

To accomplish this a pair of mappings are introduced. Their function is to allow reassignment of input and output parameters by using an index, such as the list (2,3) which will assign input parameter 1 to function parameter 2 and input parameter 2 to function parameter 3. Such a simple numeric pair arrangement can be visualized via a mapping table as depicted in FIG. 4 which allows mapping between source (input) and destination (function) parameters. FIG. 4 shows the example discussed above where actual input 1 is mapped to function input 2 and also shows actual input 4 mapped to function input 1. Such an arrangement creates a mapping between what is set on the destination function and what will internally be set on the source function, and vice-versa for output parameters. Shown below is the data structure with additions to implement such a mapping.

Data Structure with Mapping Added

```
Class Cmapping {
    TindexArray      fIndexMapping;
    Index getMapping(index) { return fIndexMapping[index]; }
};
Class CfunctionType {
Public:

TrttiIdArray        fInputTypes,      fOutputTypes;
TvoidPtrArray       fInputDefaults,   fOutputDefaults;
Cmapping            fInputMapping,    fOutputMapping;
Void                evaluate( ) = 0;
Void                setInput( index, newValue )
                      { fInputValues[index] = newValue; }
outputValue         getOutput( index )
                      { return fOutputValues[index]; }
Private:

TvoidPtrArray   InputValues,      fOutputValues;
    Void*           fFunctionPointer;
};
```

This mapping arrangement can allow arbitrary parameter reassignment, and with the existence of default parameter values for both inputs and outputs, the functions at the source and destination can be any arbitrary functions. Of course they will only be useful if at least one of each type of parameter is successfully mapped. If no outputs are mapped then the function will only ever return default output values. If no inputs are mapped then the function will only ever evaluate with default inputs and so will probably be static.

The parameter mapping between existing parameters is the obvious one. The input mapping (3,2) for example defines that setting input parameter 2 results in the internal input parameter 2 receiving the value, and that setting input parameter 1 results in the internal input parameter 3 receiving the value. Additional mapping modes can be used which define a relationship where input parameters are ignored and output parameters are unmapped and will only take on default values. These modes are simply implemented using a flag such as a negative number mapping like (1,−1) where the second parameter passed is ignored.

A mapping between the functions ƒ(surface,u,v)=(color,x,y,z) and g(a)=b can easily be defined to take advantage of the compatible data types in a, b, u, v, x, y, z as hypothetically shown below.

Mappings on G to Accept Function F as Input fInputMapping [1]; //Input "a" goes to F input "u"

fOutputMapping=[1]; //Output "b" comes from F output "x"

Generalized Mapping

More complicated mapping functions than a simple numeric correspondence can be set up to map otherwise incompatible parameter lists. For instance, a function can be set up to transfer from one data type to another as well as reordering the position (e.g. Surface to Curve) so even completely different functions can drive each other through the use of reordering and recasting of parameters. This requires generalizing not only the mapping class but also the function class that makes use of it. In the following implementation the value and type are passed in for mapping but any other information that a mapping could make use of could also be passed, e.g. the entire function data structure plus the value index.

Revamped Function Data Structure Using Generalized Mapping Technique

```
Class CfunctionType {
Public:

TrttiIdArray      fInputTypes,      fOutputTypes;
    TvoidPtrArray     fInputDefaults,   fOutputDefaults;
    Cmapping          fInputMap,        fOutputMap;
    Void              evaluate( ) = 0;
    Void              setInput( i, newValue )
        { fInputValues[i]=fInputMap.map(i, newValue, fInputTypes); }
    rttiData          getOutput ( i )
        { return fOutputMap.map(i, fOutputValues[i], fOutputTypes); }
Private:

TvoidPtrArray     fInputValues,     fOutputValues;
    Void*             fFunctionPointer;      };
```

A typical mapping class is one that contains both an index remapping as above plus a matrix of data casting methods which will change one type of data into another. A data casting method is a function that receives one type of data as input and returns a different type, the "cast" type, of data is output without, inasmuch is possible, changing the value of the data. For example, this trivial function "integerCast" makes use of a conventional compiler casting facility to cast from an integer type into a double type:

double integerCast(int i) {return (double) i;}

The implementation below has information on converting between double and integer values but the extension to other function types would be within the skill of those in the art.

Generalized Mapping Class that Converts Between Double and Integer Data Types, as Well as Reordering Parameter List

```
Class Cmapping {
    TindexArray                    fIndexMapping;
    rttiData                       map(index, srcData, typeArray)
{
        newIndex = fIndexMapping[index];
        dstType = typeArray[newIndex];
        // Simple case : Requested type is the input data type
        if( srcData type = = dstType)
            return srcData;
        if( srcData type is double && dstType is integer )
        {
            return RTTIint( srcData );
        }
        else if( srcData type is integer && dstType is double )
        {
            return RTTIdouble( srcData );
        }
        else
            Throw a type mismatch exception
};
```

Within the DG context it is advantageous to describe several heuristics with which to perform automatic parameter remapping, so that compatible functions can be connected directly with minimal effort. The particular ones employed in this invention given two hypothetical functions f and g to be connected are:

Match by position—If the parameter in position N of function f has the same type as the parameter in position N of function g then map them directly to each other.

Match by name—In the DG all function parameters will have a name so this fact can be used to scan the parameters remaining unmapped under the above heuristic and creating a mapping between any parameter in f that have the same name and compatible type as a parameter in g.

Match by type—If the parameter in position N of function $f$ failed to map given the above rules then search all unmapped parameters of function g until one of identical type is found and map one to the other.

Match by compatibility—Even if types are not identical a type-based matching is still possible if their exists a data casting method as described above to convert the source parameter type of g into the destination parameter type of f.

Match manually—Finally the user is provided access to the mapping index directly and can manually hookup parameters from f to parameters of g. The system verifies each mapping to ensure that the parameter types are compatible according to the rules above.

A more sophisticated mapping technique that does not just perform 1 to 1 index mappings but N to N mapping can also be used. One of these mapping, for the function f(x,y,z)=s takes input 1 ("x") and puts it into inputs 1, 2, and 3, effectively turning this function into f(x,x,x). For the function f(vector), where "vector" is a combination of 3 double values another mapping sets a single part of it by mapping input 1 onto vector-sub-x, input 2 onto vector-sub-y, and input 3 onto vector-sub-z. This kind of mapping requires internal knowledge of the "topology" of the parameter lists so that it can decide which pieces of each parameter were mappable.

The present invention can also provide for vectorization of the function calls. This involves setting a list of parameter values and having the self-evaluating data structure call itself once per set of parameters. For example, instead of calling f(x)=y where x and y are doubles you'd call f(xArray)=yArray, where xArray and yArray are lists of doubles of arbitrary length.

The present invention can also include an embodiment in which brand new self-evaluating classes are created for every function. This allows more specific mappings, tailored to the specific needs of the function, and avoids the small but potentially noticeable overhead of carrying around the function pointer. This embodiment, while potentially much faster, also includes the cost of creating and maintaining this embodiment which may be high.

As can be seen from the above description an important feature of the present invention is the fact that the destination node has an idea of what its function is to perform via a certain algorithm. The destination node calls the self-evaluating data structure passed from the source node as though it precisely implemented that function, but in reality the data structure itself may contain an entirely different function with completely different parameters, both inputs and outputs. The power of this data structure really lies in this fact; that arbitrary functions can masquerade as other functions and do what is essentially "the right thing" or the actually needed thing from a programming standpoint.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
evaluating a dependency graph of a graphics creation process using a computer, comprising:
passing a pointer to an algorithm associated with a first dependency node to a second dependency node allowing the second dependency node to execute the algorithm without requiring the second dependency node to have knowledge of the first dependency node; and
executing the algorithm as part of an evaluation of the second dependency node and displaying a graphic resulting from the graphics creation process.

2. A method as recited in claim 1, wherein the algorithm comprises a self evaluating data structure.

3. A method as recited in claim 2, wherein the algorithm comprises an algorithm having a defined set and type of inputs and outputs.

4. A method as recited in claim 2, wherein the structure comprises an algorithm calling method.

5. A method as recited in claim 2, wherein the evaluating comprises determining a type of a passed parameter.

6. A method as recited in claim 5, wherein the algorithm parameter types are identified dynamically as the dependency graph is executed.

7. A method as recited in claim 6, wherein the data structure contains information describing a set of input and output parameters the algorithm accepts.

8. A method as recited in claim 7, wherein the information determines if algorithm attribute types within the dependency graph are compatible.

9. A method as recited in claim 8, wherein the data structure comprises default values for all input and output parameters.

10. A method as recited in claim 1, further comprising mapping parameters of first and second algorithms of the first and second nodes.

11. A method as recited in claim 10, wherein said mapping comprises using an index.

12. A method as recited in claim 10, wherein the mapping defines a relationship where input parameters are ignored and output parameters are unmapped and take on default values.

13. A method as recited in claim 10, wherein parameter value and type are passed for the mapping.

14. A method as recited in claim 10, wherein the algorithm data structure and value index are passed for the mapping.

15. A method as recited in claim 10, wherein the mapping comprises an index remapping and a matrix of data casting methods which will change one type of data into another.

16. A method, comprising:
evaluating a dependency graph of a graphics creation process using a computer, comprising:
passing a pointer to an algorithm of a first dependency node to a second dependency node allowing the second dependency node to execute the algorithm of the dependency node, the algorithm comprising a self evaluating data structure comprising an algorithm calling method and containing information describing a set of input and output parameters the algorithm accepts where the information determines if algorithm attribute types within the dependency graph are compatible and comprising default values for all input and output parameters;
mapping parameters of first and second algorithms of the first and second nodes, where the mapping comprises an index, defines a relationship where input parameters are ignored and output parameters are unmapped and take on default values, where parameter value and type are passed for the mapping and the algorithm data structure and value index are passed for the mapping; and
executing the algorithm of the first dependency node as part of an evaluation of the second dependency node using the pointer, each time input data changes, determining a type of a passed parameter where parameter types are identified dynamically as the dependency graph is executed, and displaying a graphic resulting from the graphics creation process.

17. A method as recited in claim 16, wherein the mapping comprises an index remapping and a matrix of data casting methods which will change one type of data into another.

18. A method, comprising:
evaluating a dependency graph of a graphics creation process using a computer, comprising:
passing a pointer to an algorithm from a first node in a node network to a second node in the node network allowing the second node to execute the algorithm without requiring the second node to have knowledge of the first node; and
executing the algorithm as part of an evaluation of the second node each time input data changes and generating a graphic resulting from the graphics creation process.

19. An apparatus comprising a computer including a dependency node evaluation system having pointers to algorithms passed between nodes of a dependency graph of a graphics creating process allowing the nodes receiving the pointers to execute the algorithms, the system evaluating the dependency graph based on the algorithms passed between the nodes and exporting or displaying a graphic resulting from the graphics creation process without requiring the nodes to have knowledge of each other.

20. A data structure provided on computer readable storage controlling a computer in association for evaluating a dependency graph of a graphics creation process, the data structure comprising a run time type identification parameter list, a mapping substructure comprising an index mapping, mapping methods, and a data casting matrix, an algorithm pointer, and methods for setting inputs, getting outputs, evaluating an algorithm using the passed pointer and displaying a graphic resulting from the graphics creation process.

21. A method, comprising:
evaluating a dependency graph of a graphics creation process using a computer, comprising:
performing, by a destination node, of an algorithm having a function known to the destination node by evaluating a self evaluating data structure passed from a source node to the destination node using a pointer to the algorithm; and
allowing the destination node to execute the algorithm of the source node and the structure expected to precisely implement the algorithm known to the destination node and generating a graphic based on the graphics creation process, where the self evaluating data structure can comprise a different algorithm with different parameters and performing the different algorithm actually requested by the destination node.

22. A method of evaluating a dependency graph, comprising:
passing an algorithm associated with a first dependency node to a second dependency node;
executing the algorithm via the second node as part of an evaluation of the second node; and
reexecuting the algorithm via the second node each time input data of the second node changes and displaying a graphic resulting from a graphics creation process without requiring the second node to have knowledge of the first node.

23. A method of evaluating a dependency graph, comprising:
    passing an algorithm associated with a first dependency node to a second dependency node; and
    executing the algorithm via the second node as part of an evaluation of the second node and exporting or displaying a graphic resulting from a graphics creation process without requiring the second node to have knowledge of the first node.

24. A method of evaluating a dependency graph of a graphics creation process using a computer, comprising:
    passing a pointer with an algorithm associated with a first dependency node to a second dependency node allowing the second dependency node to execute the algorithm; and
    calling the algorithm via the second dependency node, executing the algorithm as part of an evaluation of the second dependency node each time input data changes and displaying a from the graphics creation process without requiring the second dependency node to have knowledge of the first dependency node.

25. A method of evaluating a dependency graph of a graphics creation process using a computer, comprising:
    passing a first algorithm associated with a first dependency node to a second dependency node allowing the second dependency node having a second algorithm to execute the first algorithm, and
    wherein the first algorithm is embedded in the second dependency node and executed as part of an evaluation of the second dependency node to generate a graphic resulting from the graphics creation process without requiring the second dependency node to have knowledge of the first dependency node.

* * * * *

UNITED STATES PATENT AND TRADEMARK OFFICE
CERTIFICATE OF CORRECTION

PATENT NO. : 7,414,626 B1  
APPLICATION NO. : 09/580563  
DATED : August 19, 2008  
INVENTOR(S) : Kevin Peter Picott It is certified that error appears in the above-identified patent and that said Letters Patent is hereby corrected as shown below:

Title Pg, Item (54) (Title), Line 3, change "GRAPHIC" to --GRAPHICS--.

Column 1, Line 3, change "GRAPHIC" to --GRAPHICS--.

Figure 1:
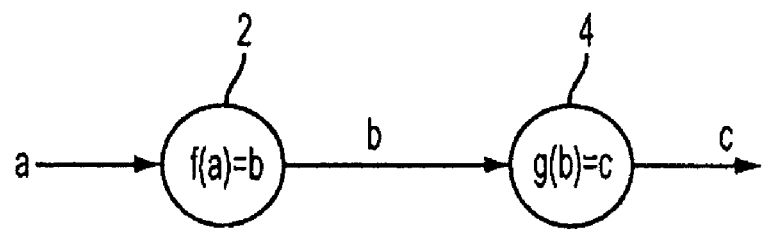
FIG. 1 shows data passing between nodes of a dependency graph.
Figure 2:
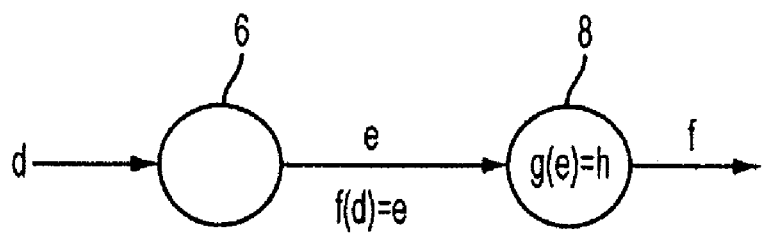
FIG. 2 shows function passing between nodes of a dependency graph.

Column 3, Line 11, change "FIG. 3," to --FIG. 1,--.

Column 4, Line 19, change "SetValue(inputParameter)" to --SetValue(inputParameter);--.

Column 5, Line 26, change "functions" to --function f--.

Column 5, Line 29, change "off," to --of f,--.

Column 5, Line 36, change "fOutputTYpes" to --fOutputTypes--.

Column 6, Line 54, change "fInputMapping [1];" to --fInputMapping = [1];--.

Column 12, Line 2, after "a" insert --graphic resulting--.

Signed and Sealed this

Eleventh Day of November, 2008

JON W. DUDAS  
*Director of the United States Patent and Trademark Office*